UNITED STATES PATENT OFFICE.

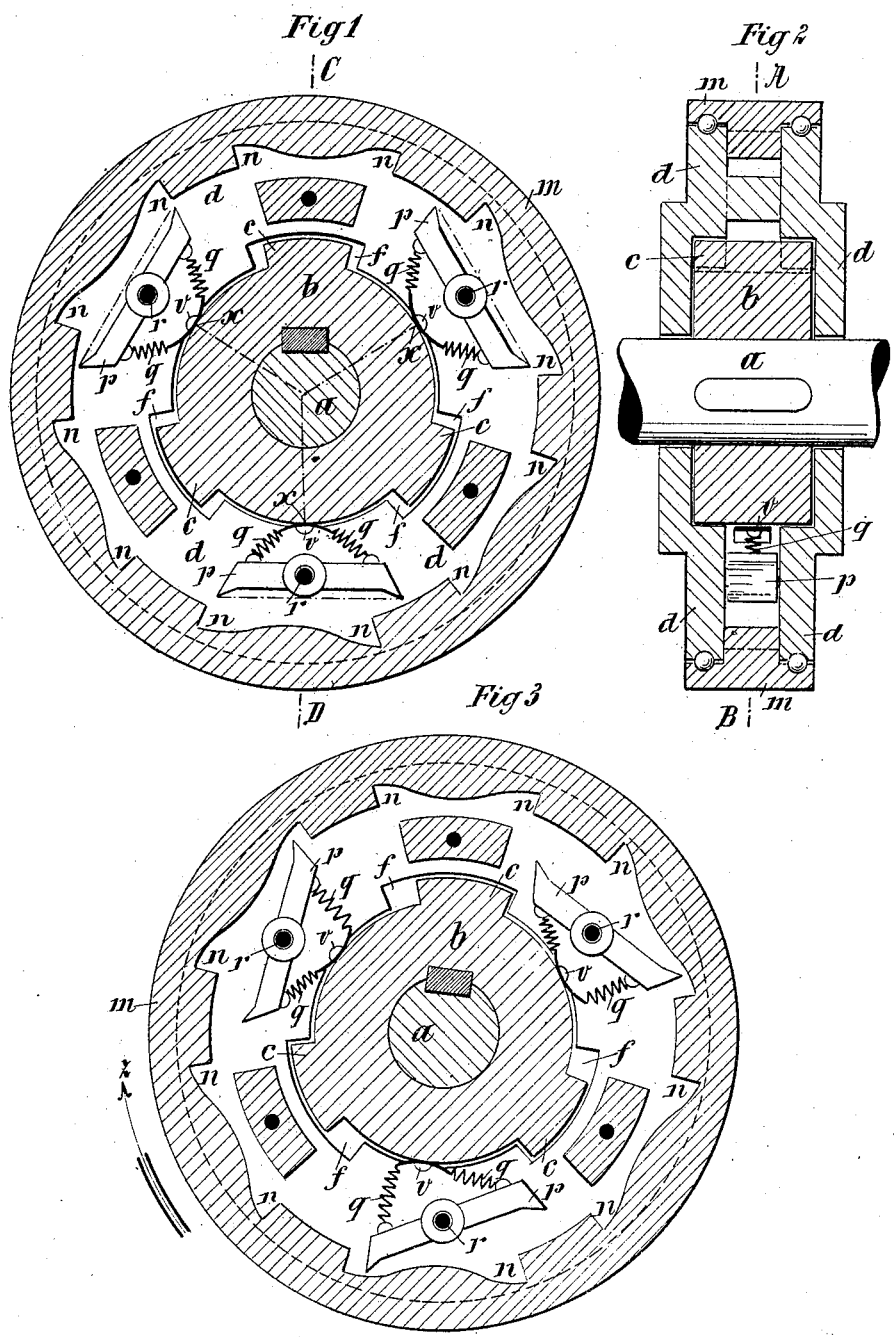

MAX HANUSCH, OF MARIENBAD, AUSTRIA-HUNGARY.

DOUBLE-PAWL COUPLING.

No. 879,960.　　　　Specification of Letters Patent.　　　　Patented Feb. 25, 1908.

Application filed April 12, 1906. Serial No. 311,372.

*To all whom it may concern:*

Be it known that I, MAX HANUSCH, official, a citizen of the Empire of Austria-Hungary, residing at Marienbad, Bohemia, Austria-Hungary, have invented certain new and useful Improvements in Double-Pawl Couplings, of which the following is a specification, reference being had therein to the accompanying drawing.

This invention relates to a double pawl coupling specially applicable for motor driven vehicles and which permits of driving or running idle, when rotated in either direction.

Figure 1 of the annexed drawing is a vertical section through the coupling on line A—B of Fig. 2. Fig. 2 is a cross-section through the coupling on line C—D of Fig. 1. Fig. 3 is a vertical section like Fig. 1 but showing the pawls in gear for driving the coupling in the direction indicated by the arrow, while in Fig. 1 and 2 the double pawls are shown in the central position, being out of engagement.

By preference the coupling is built into the hub $m$ of the driving wheel or into that of a disk adapted to rotate the driving wheel shaft.

The coupling is constructed as follows: Upon the driving shaft $a$ is keyed a disk $b$ having on its periphery segmental projections $c$. Upon this disk is mounted a second ring-like disk $d$, the inner periphery of which has segmental recesses $f$ corresponding in number with that of and slightly longer in the arc than the said projections $c$ so that the outer disk $d$ to a certain extent will run idle upon the inner disk $b$, that is to say, will not be engaged until the segmental projections $c$ have run a distance equal to half of the difference in the length of arc between the projections $c$ and the recesses $f$. Upon the outer disk $d$ is mounted, say by means of antifriction balls, the wheel hub $m$ having internally ratchet teeth $n$ pointing alternately in opposite directions.

The disk $d$ carries a series of double pawls $p$ adapted to oscillate, both arms of each of which are connected by springs $q$, $q$ to points $v$ of the disk $b$. When the disk $d$ runs idle and is in the middle position as shown in Fig. 1, the points $v$ coincide with the points $x$ where the radius to the fulcrum $r$ of the respective double pawl intersect the periphery of the inner disk $b$. The said springs $q$ being all of one length and strength, in the relative position of the two disks $b$, $d$ shown in Fig. 1, the double pawls will take up such a position, that each pawl is perpendicular to the radius $r x$ of the pawl fulcrum $r$. In this position both arms of each double pawl are out of gear with the internal ratchet teeth of the hub $m$. If however the shaft $a$ is driven in one or the other direction, for instance that indicated by the arrows $z$, shown in Fig. 3, the disk $d$ carrying the pawl owing to being idle and the frictional resistance at its periphery, will remain behind the inner disk $b$ until the segmental projections $c$ on the inner disk $b$ have passed through and arrived at the ends of the segmental recesses $f$; during this operation the points $v$ at which the springs $q$, $q$ are secured will have moved from its central position and the spring $q$ situated in front of the pawl in the direction of the rotation been released while the one at the back has been tensioned, which causes the pawls $p$ to turn and bring their front ends against the inner periphery of the hub $m$ on which they will slide until they arrive at the bottom of the teeth and thereby engage the hub $m$.

If the speed of the driven wheel $m$ exceeds that of the driving shaft $a$, for instance when going down hill, or when the latter is stopped, the inner periphery of the hub $m$ slides over the pawls $p$ and the outer wheel will run idle, without using the motor shaft.

Owing to the wheel of the hub $m$ being idle when running at a greater speed than the driving shaft, the device described may also be used in place of the usual differential gear, as when turning, the inner wheel will run at a speed corresponding with that of the driving shaft while the outer wheel runs quicker.

Having now particularly described my invention what I claim is:

A double pawl coupling comprising a notched disk $b$ secured upon the shaft, disk $d$ loose on the shaft at opposite sides of disk $b$ having inner teeth projecting into the recesses of disk $b$ their length in circular direction being shorter than the recesses, double armed pawls fulcrumed between the disks $d$, springs connecting the ends of the pawls to the disk $b$ at points about the middle of the recesses and a wheel hub loosely mounted on the periphery of the disks $d$ having inner ratchet teeth projecting between said disks and adapted to be engaged by either end of the pawls substantially as described.

In testimony whereof I hereunto affix my signature in presence of two witnesses.

MAX HANUSCH.

Witnesses:
 EMILE MÜLLER,
 BRUNO SCHMIDT.